United States Patent [19]
Takahashi et al.

[11] Patent Number: 5,581,679
[45] Date of Patent: Dec. 3, 1996

[54] METHOD FOR REPRESENTING AN APPROXIMATION OF A CURVILINEAR CURVE AND CONSTRUCTING A CURVE FROM THE APPROXIMATION

[75] Inventors: Shingo Takahashi; Aisaku Imanishi, both of Tokyo, Japan

[73] Assignee: Seiko Precision Inc., Tokyo, Japan

[21] Appl. No.: 775,660

[22] Filed: Oct. 10, 1991

[30] Foreign Application Priority Data

Oct. 17, 1990 [JP] Japan ............................ 2-278098

[51] Int. Cl.$^6$ .................................................. G06T 11/00
[52] U.S. Cl. ................................................ 395/142
[58] Field of Search .............................. 395/140–143, 395/150, 151

[56] References Cited

U.S. PATENT DOCUMENTS 4,686,636  8/1987  Schrieber ........................ 395/142

FOREIGN PATENT DOCUMENTS

| | | |
|---|---|---|
| 0349182 | 1/1990 | European Pat. Off. . |
| 0395482 | 10/1990 | European Pat. Off. . |
| 64-44758 | 2/1989 | Japan . |
| 01227187 | 9/1989 | Japan . |
| 2203613 | 10/1988 | United Kingdom . |

OTHER PUBLICATIONS

Computers & Graphics, vol. 10, No. 1, 1986, New York, USA, Martinelli and Tani 'fast hardware graphic generators of curve families'.

*Primary Examiner*—Almis R. Jankus
*Attorney, Agent, or Firm*—Jordan and Hamburg

[57] ABSTRACT

A method for approximately representing a first curve having anchor points and a control point, wherein the first curve is subdivided into a plurality of segments and an approximate curve is constructed by joining the points corresponding to the ends of the segments with straight lines. The number of segments is a prestored value.

10 Claims, 13 Drawing Sheets

| Points | ( x, y ) | Δ L | Number of Subdivisions N | Step |
|---|---|---|---|---|
| P A | 0, 0 | 169.1 | 32 | 8 |
| P B | 50, 120 | | | |
| P C | 80, 100 | | | |
| P D | 100, 0 | | | |
| P A | 0, 0 | 64.6 | 16 | 16 |
| P B | 50, 60 | | | |
| P C | 80, 50 | | | |
| P D | 100, 0 | | | |
| P A | 0, 0 | 21.7 | 8 | 32 |
| P B | 50, 30 | | | |
| P C | 80, 25 | | | |
| P D | 100, 0 | | | |
| P A | 0, 0 | 6.9 | 4 | 64 |
| P B | 50, 15 | | | |
| P C | 80, 12.5 | | | |
| P D | 100, 0 | | | |
| P A | 0, 0 | 1 | 1 | 256 |
| P B | 50, 0 | | | |
| P C | 80, 0 | | | |
| P D | 100, 0 | | | |

| n | t | WA | WB | WC | WD |
|---|---|---|---|---|---|
| 0 | 0/256 | WA0 | WB0 | WC0 | WD0 |
| 1 | 1/256 | WA1 | WB1 | WC1 | WD1 |
| 2 | 2/256 | WA2 | WB2 | WC2 | WD2 |
| · | · | · | · | · | · |
| · | · | · | · | · | · |
| · | · | · | · | · | · |
| · | · | · | · | · | · |
| 255 | 255/256 | WA255 | WB255 | WC255 | WD255 |
| 256 | 256/256 | WA256 | WB256 | WC256 | WD256 |

FIG. 6

| Address | Data |
|---------|------|
| 0 0 0 0 | W A 0 |
| 0 0 0 1 | W A 1 |
| . | . |
| . | . |
| 0 2 5 6 | W A 256 |
| 0 2 5 7 | W B 0 |
| 0 2 5 8 | W B 1 |
| . | . |
| . | . |
| 0 5 1 3 | W B 256 |
| 0 5 1 4 | W C 0 |
| 0 5 1 5 | W C 1 |
| . | . |
| . | . |
| 0 7 7 0 | W C 256 |
| 0 7 7 1 | W D 0 |
| 0 7 7 2 | W D 1 |
| . | . |
| . | . |
| 1 0 2 7 | W D 256 |

FIG. 7

| Address | Data |
|---------|------|
| 0 0 0 0 | P A X 0 |
| 0 0 0 1 | P B X 0 |
| 0 0 0 2 | P C X 0 |
| 0 0 0 3 | P D X 0 |
| 0 0 0 4 | P A Y 0 |
| 0 0 0 5 | P B Y 0 |
| 0 0 0 6 | P C Y 0 |
| 0 0 0 7 | P D Y 0 |
| 0 0 0 8 | P A X 1 |
| 0 0 0 9 | P B X 1 |
| 0 0 1 0 | P C X 1 |
| 0 0 1 1 | P D X 1 |
| 0 0 1 2 | P A Y 1 |
| 0 0 1 3 | P B Y 1 |
| 0 0 1 4 | P C Y 1 |
| 0 0 1 5 | P D Y 1 |
| 0 0 1 6 | P A X 2 |
| ⋮ | ⋮ |

FIG. 8

| Address | Data |
|---------|------|
| 0 0 0 0 | Δ n 1 |
| 0 0 0 1 | Δ n 2 |
| 0 0 0 2 | Δ n 3 |
| 0 0 0 3 | Δ n 4 |
| · | · |
| · | · |
| · | · |

FIG.9

| Address | Data |
|---------|------|
| 0 0 0 0 | X 0,0 |
| 0 0 0 1 | Y 0,0 |
| 0 0 0 2 | X 0,1 |
| 0 0 0 3 | Y 0,1 |
| ⋮ | ⋮ |
| 0 0 3 1 | X 0,16 |
| 0 0 3 2 | Y 0,16 |
| 0 0 3 3 | X 1,0 |
| 0 0 3 4 | Y 1,0 |
| 0 0 3 5 | X 1,1 |
| 0 0 3 6 | Y 1,1 |
| ⋮ | ⋮ |
| 0 0 9 6 | X 1,32 |
| 0 0 9 7 | Y 1,32 |
| 0 0 9 8 | X 2,0 |
| 0 0 9 9 | Y 2,0 |
| ⋮ | ⋮ |

| Points | (x, y) | ΔL | Number of Subdivisions N | Step |
|---|---|---|---|---|
| PA<br>PB<br>PC<br>PD | 0, 0<br>50, 120<br>80, 100<br>100, 0 | 169.1 | 32 | 8 |
| PA<br>PB<br>PC<br>PD | 0, 0<br>50, 60<br>80, 50<br>100, 0 | 64.6 | 16 | 16 |
| PA<br>PB<br>PC<br>PD | 0, 0<br>50, 30<br>80, 25<br>100, 0 | 21.7 | 8 | 32 |
| PA<br>PB<br>PC<br>PD | 0, 0<br>50, 15<br>80, 12.5<br>100, 0 | 6.9 | 4 | 64 |
| PA<br>PB<br>PC<br>PD | 0, 0<br>50, 0<br>80, 0<br>100, 0 | 1 | 1 | 256 |

FIG. 14

METHOD FOR REPRESENTING AN APPROXIMATION OF A CURVILINEAR CURVE AND CONSTRUCTING A CURVE FROM THE APPROXIMATION

RELATED APPLICATIONS

This application is related to U.S. patent application Ser. No. 07/775,651 ABN and Ser. No. 07/775,659 ABN, both having the same common inventors as this instant application, both being filed concurrently herewith, the disclosures of both being incorporated herein by reference.

FIELD OF THE INVENTION

The present invention relates to a curvilinear approximation method for an outline font.

BACKGROUND OF THE INVENTION

In recent years, outline fonts have been increasingly used for expressing curves of a character or graph.

In the actual depiction of a curve using the outline font in the prior art, the curve is sequentially subdivided until adjacent subdividing points are degenerated to the same point. The curve is approximately expressed by sequentially connecting the respective subdividing points with straight lines.

The conventional methods present the problem that the subdividing points and the number of subdivisions have to be obtained every time curvilinear data for the outline font is generated. In addition, generation of the outline font requires a large amount of time.

SUMMARY OF THE INVENTION

Accordingly, it is an object of this invention to reduce the time needed for generating the outline font.

According to this invention, a curvilinear approximation method for approximately expressing a curve is provided, comprising the steps of subdividing the curve depicting a character or graph into segmental curves; subdividing the segmental curve into a plurality of parts; and connecting subdividing points adjacent to one another with a straight line. Data corresponding to the number of subdivisions of the segmental curves is preset for every segmental curve.

DESCRIPTION OF THE PREFERRED EMBODIMENTS

An embodiment of the present invention will hereinafter be described with reference to the accompanying drawings.

In the following embodiment, so far as the conditions are not particularly prescribed, a cubic curve such as a cubic Bezier curve and a cubic Spline curve is used for expressing an outline font. These curves are parametrically expressed as follows:

$$Q = WA \times PA + WB \times PB + WC \times PC + WD \times PD \tag{1}$$

where WA, WB, WC and WD are the functions expressed by using a parameter "t". Take the cubic Bezier curve for example, these functions are given by:

$$WA = (1-t)^3 \tag{2a}$$

$$WB = 3t \cdot (1-t)^2 \tag{2b}$$

$$WC = 3t^2 \cdot (1-t) \tag{2c}$$

$$WD = t^3 \tag{2d}$$

$$(0 \leq t \leq 1)$$

Figure 5:
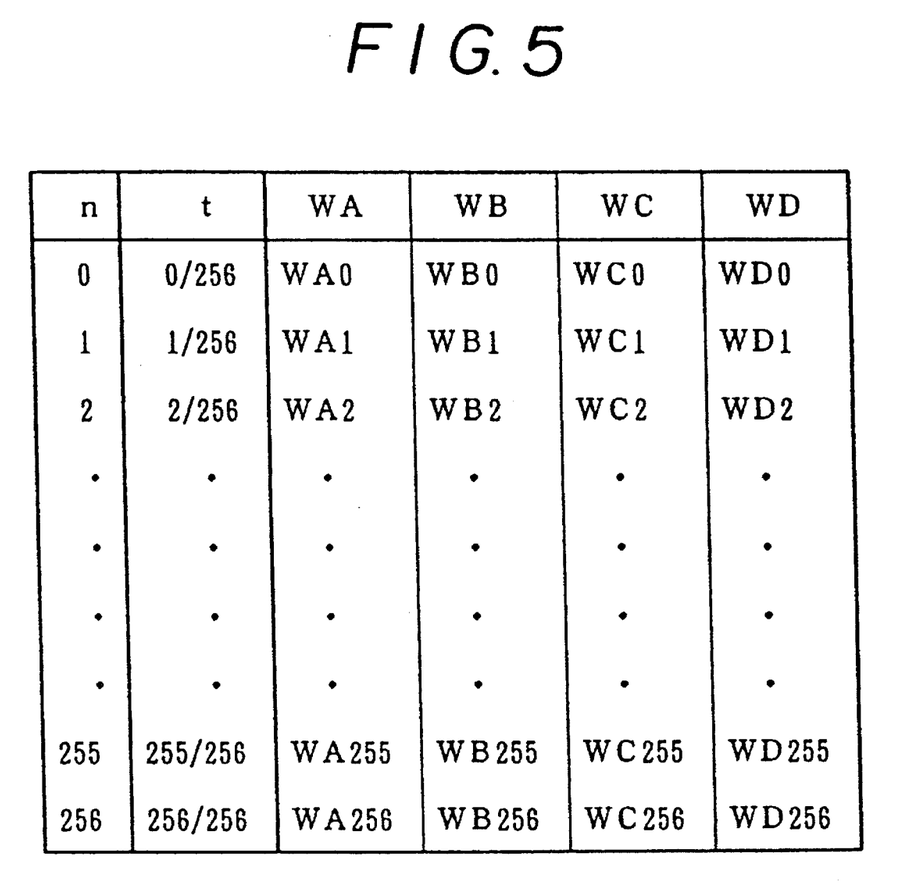
FIG. 5 is a conceptual diagram of a data table.

PA, PB, PC and PD are the coordinates on an X-Y plane which determine a curvilinear configuration. These coordinates are expressed such as:

PA (x, y): anchor point
PB (x, y): control point
PC (x, y): control point
PD (x, y): anchor point Now, considering the formula (1), the parameter functions WA, WB, WC and WD are, as expressed in, e.g., the formulae (2a) through (2d), uniquely determined depending on types of the cubic curves. PA, PB, PC and PD are predetermined in accordance with the curvilinear configuration. Hence, as shown in FIG. 5, the parameter functions WA to WD are precalculated corresponding to values of the respective subdivided parameters "t". Results of the calculations can be stored in a data table. The coordinates (x, y) of PA, PB, PC and PD are also storable in the data table. The respective data are thus stored in the data table. Hardware calculations based on the formula (1) are effected using a multiplier and an adder, thereby enabling generating the curvilinear data at a high speed. More specifically, as shown in FIG. 5, the parameter "t" (0≦t≦1) is subdivided by 256. The parameter functions WA through WD are obtained per "t". Then, the hardware calculations based on the formula (1) are carried out. As a result, the coordinates at totally 257 points on the curve can be obtained. These coordinates are sequentially connected with straight lines, whereby the curve can approximately be expressed.

In the example given above, the curve is approximately expressed by subdividing the curve by 256. In the case of a curve having a small curvature, an approximate curve exhibiting a sufficient accuracy is expressible even if the curve does not undergo such a large number of subdivisions. This will be explained with reference to FIGS. 3, 4(A) and 4(B). The curve depicted in FIG. 3 consists of totally 14 segmental curves C1 through C14. Each of the segmental curves C1 through C14 is expressed by the formula (1), using different anchor and control points. FIGS. 4(A) and 4(B) respectively show the segmental curves C1 and C2 of FIG. 3. The segmental curve C1 is, as illustrated in FIG. 4(A), subdivided by 16. The segmental curve C1 is approximately expressed by 17 points Q0,0 to Q0,16 provided thereon. In an example of FIG. 5, n is incremented stepwise by sixteens (256/16=16) such as n=0, 16, 32, . . . , 256. The calculations may be effected on only these values of n. The segmental curve C2 is, as illustrated in FIG. 4(B), subdivided by 32. The segmental curve C2 is approximately expressed by 33 points Q0,0 to Q0,32 provided thereon. In the example of FIG. 5, n is incremented stepwise by eights (256/32=8) such as n=0, 8, 16, . . . , 256. The calculations may be effected on only these values of n. In this manner, a proper number of divisions is previously obtained corresponding to the curves. Only the calculations corresponding thereto are carried out, resulting in a speedup of the hardware calculations. A specific method for obtaining the number of subdivisions will be discussed later.

Referring to the above-mentioned, the curvilinear approximate method shown in FIG. 3 will hereinafter be explained.

Figure 1:
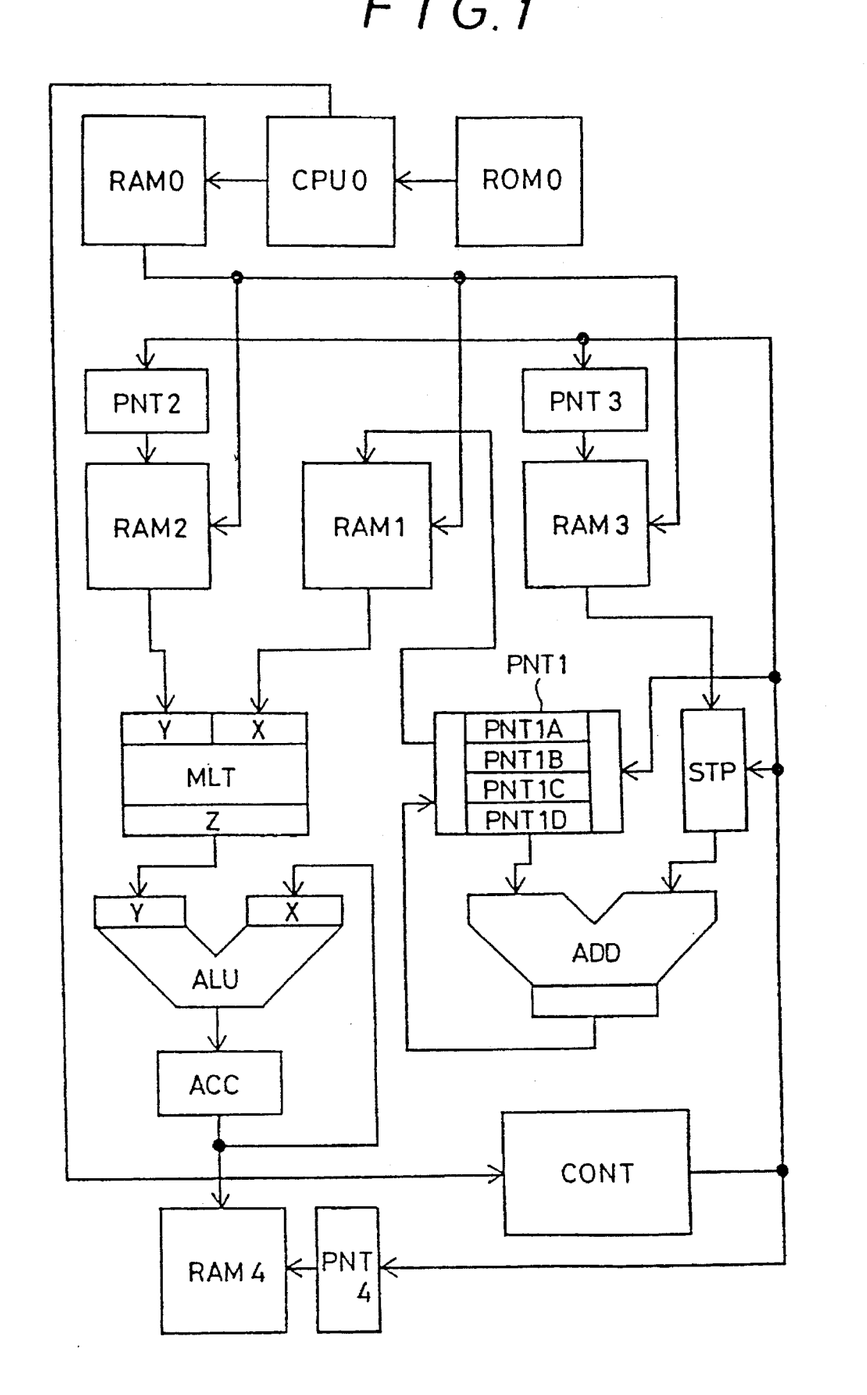
FIG. 1 is a block diagram.
Figure 3:
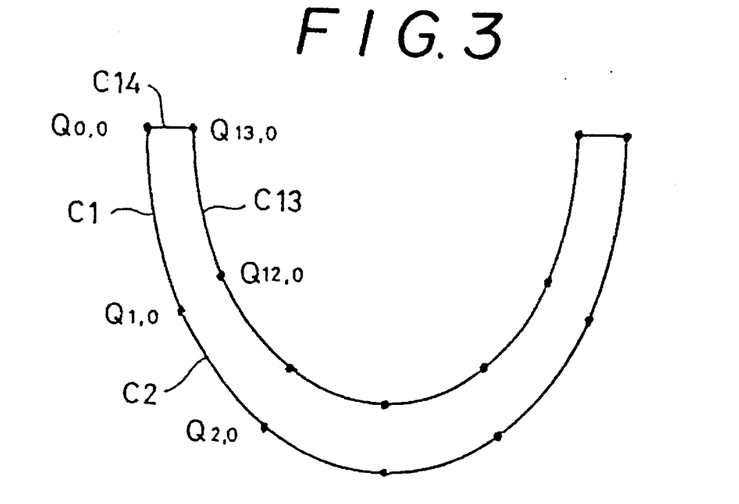
FIG. 3, 4(A) and 4(B) are diagrams to aid in the explanation of an outline font.
Figure 4A:
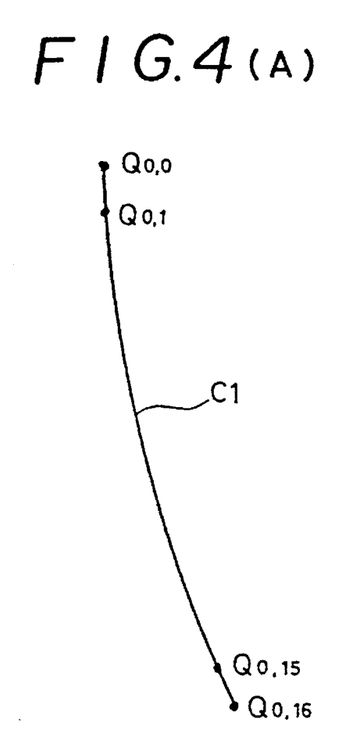
Figure 4B:
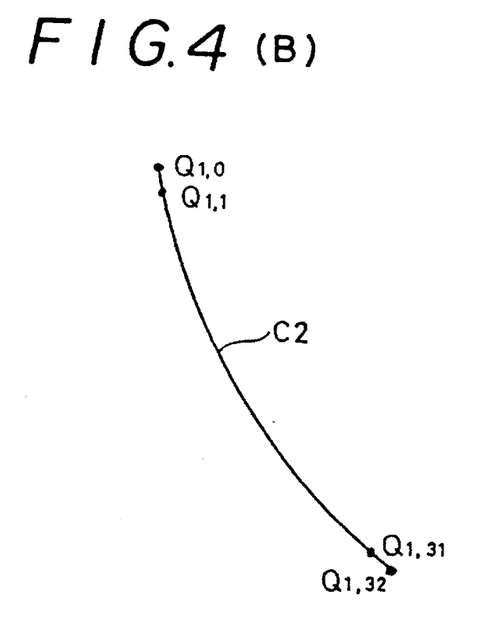

FIG. 1 is a block diagram showing hardware employed for approximately expressing the curve of FIG. 3.

A microprocessor CPU0 controls the hardware as a whole.

A read-only memory ROM0 stores programs used for a variety of processes performed by the microprocessor CPU0.

A random access memory RAM0 prestores the data which will be discussed later. Stored in RAM0 are data on a variety of curves such as the cubic Spline curve in addition to the cubic Bezier curve. The data are, as the necessity arises, transferred to RAM1, RAM2 and RAM3 which will hereinafter be described.

Figure 6:
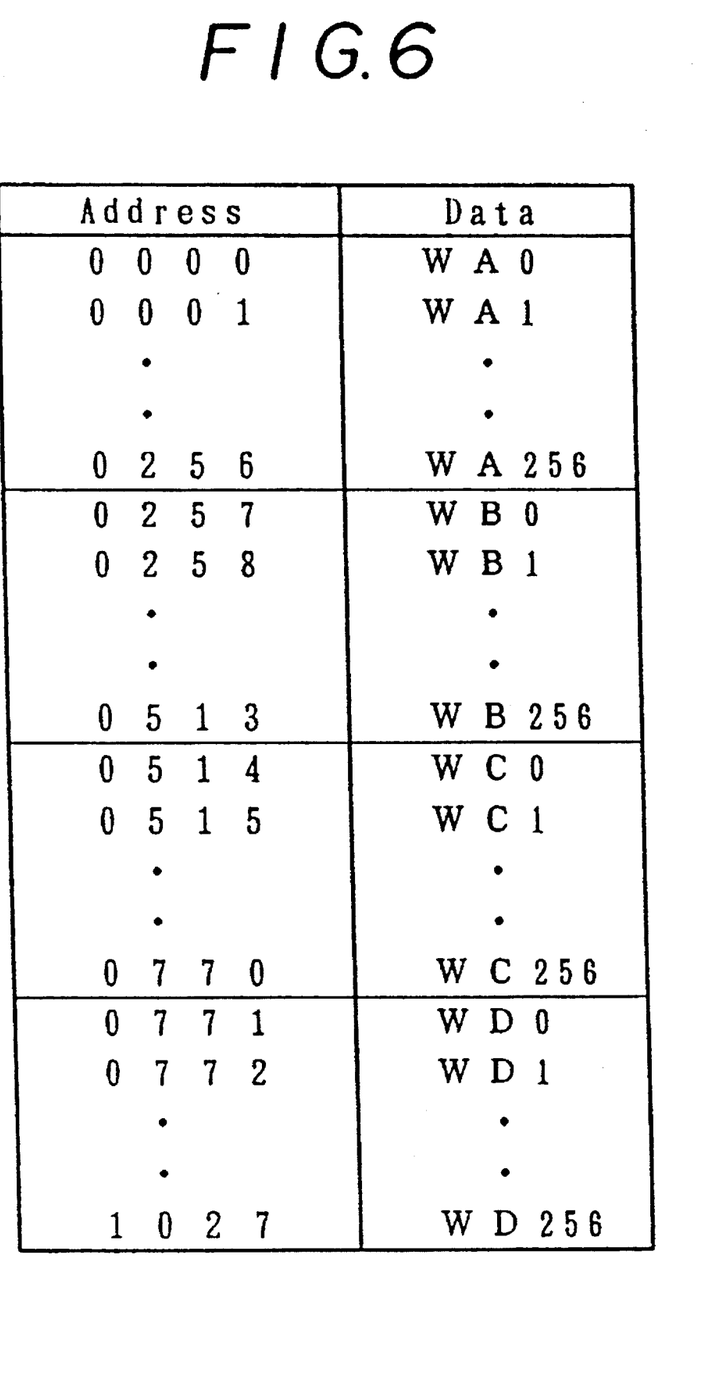
FIGS. 6 to 9 are address maps of respective data stored in RAMs.

A random access memory RAM1 stores the values of the parameter functions WA, WB, WC and WD shown in FIG. 5. Stored in RAM1 in the manner shown in FIG. 6 are data WA0–WA256, WB0–WB256, WC0–WC256 and WD0–WD256 which are transmitted from RAM0.

Figure 7:
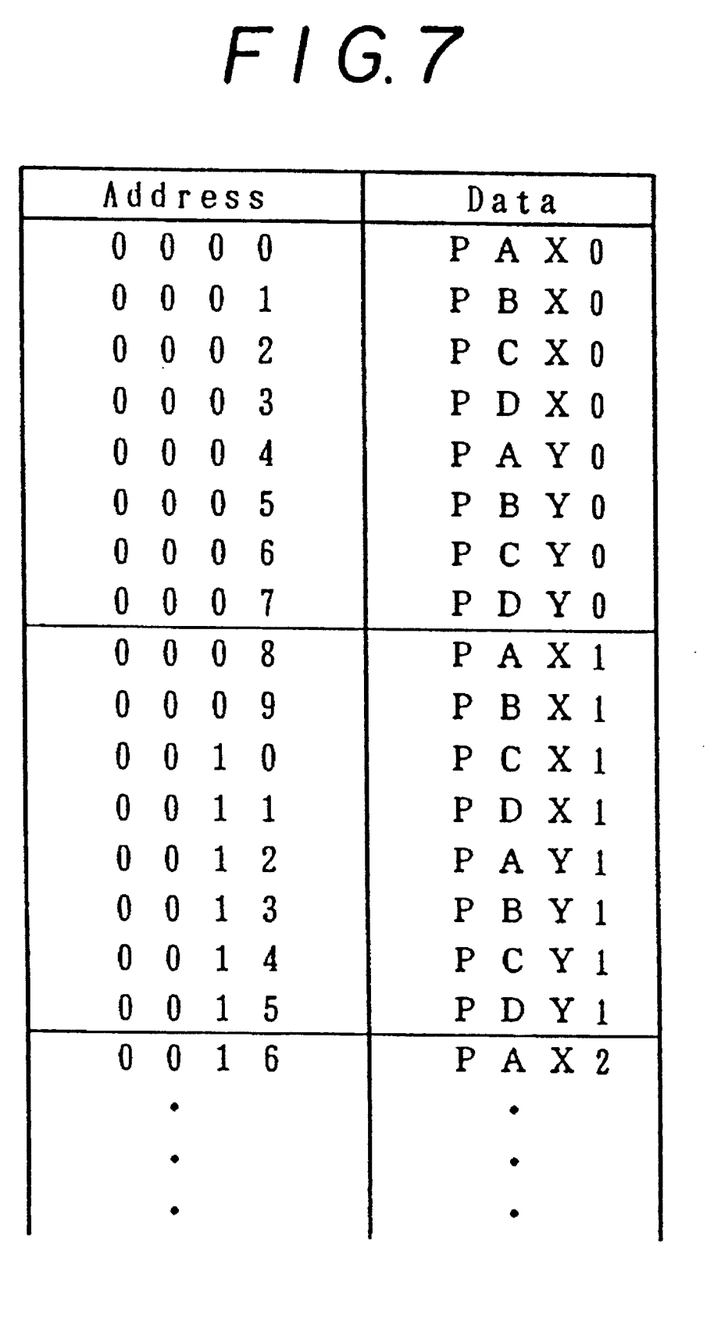

A random access memory RAM2 stores coordinate data of the anchor points PA, PD and the control points PB, PC for each of the segmental curves C1–C14 shown in FIG. 3. The coordinate data are transferred from RAM0 and stored, as illustrated in FIG. 7, in RAM2. Referring to FIG. 7, PAX0–PDX0 represent x-coordinates at the anchor and control points on the segmental curve C1. PAY0–PDY0 indicate y-coordinates at the anchor and control point. PAX1–PDX1 designate x-coordinates at the anchor and control points on the segmental curve C2. PAY1–PDY1 are y-coordinates at the anchor and control points.

Figure 8:
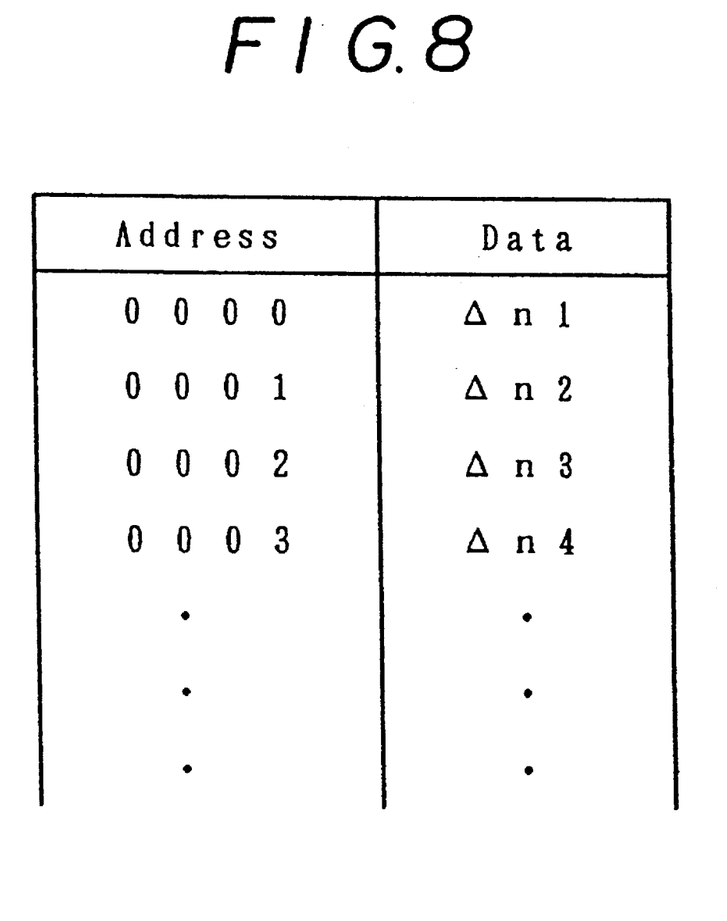

For each of the segmental curves C1–C14, a random access memory RAM3 prestores the data corresponding to the number of subdivisions of the individual segmental curves C1–C14 shown in FIG. 3. The data corresponding to the number of subdivisions may include the subdividing number itself or the step-number n shown in FIG. 5. In this embodiment, the random access memory RAM3 stores, as illustrated in FIG. 8, the step-number n, i.e., an n-increment $\Delta$n. Referring to FIG. 8, $\Delta$n1, $\Delta$n2, . . . represent the step-numbers stored corresponding to the segmental curves C1, C2, . . . of FIG. 3. Data $\Delta$n1, $\Delta$n2, . . . are transferred from RAM0 and stored, as illustrated in FIG. 8, in RAM3.

Figure 9:
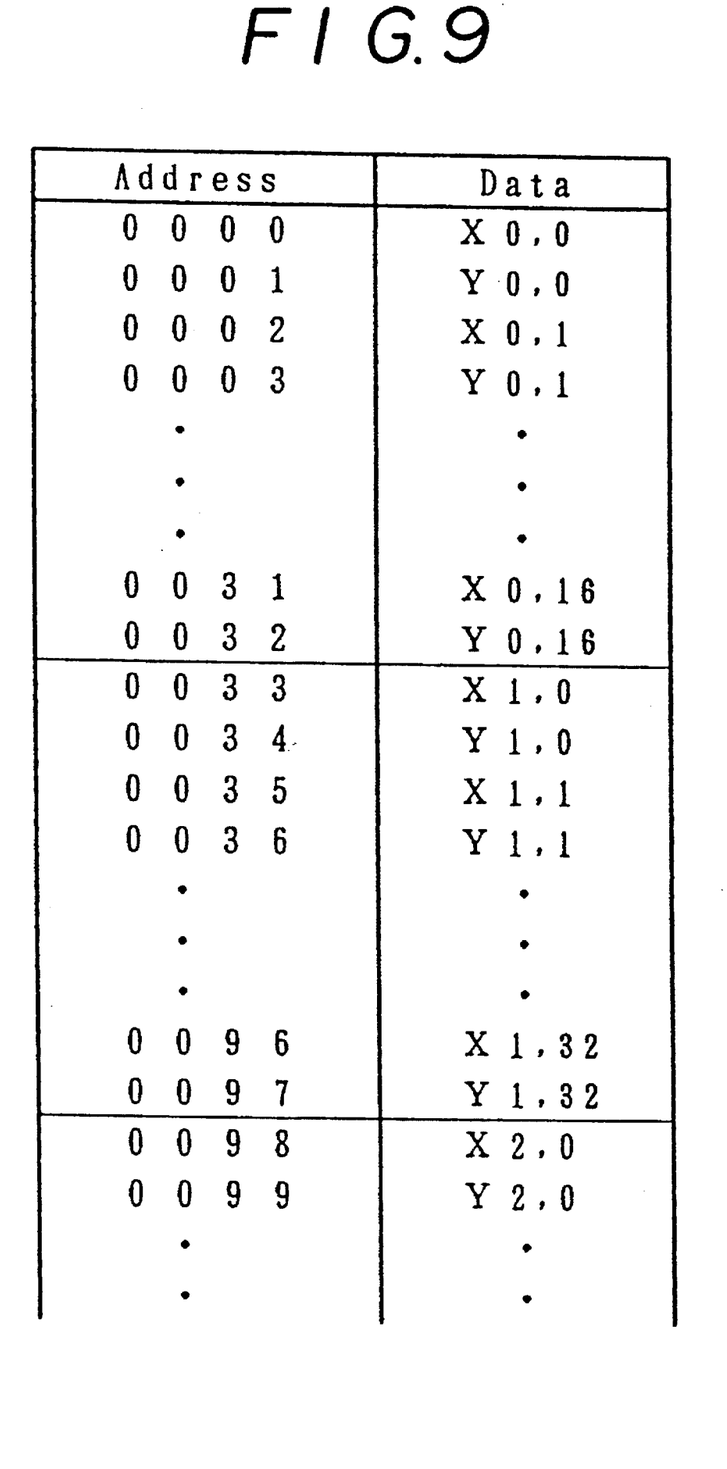

A random access memory RAM4 stores results of the hardware calculations effected in accordance with the formula (1), viz., data Q (x, y) about the coordinates on the segmental curves C1–C14. The coordinate data Q (x, y) are, as depicted in FIG. 9, stored in RAM4. Referring to FIG. 9, data X0,0–X0,16 and Y0,0–Y0,16 are x- and y-coordinates at points Q0,0–Q0,16 on the segmental curve C1 of FIG. 4(A). Data X1,0–X1,32 and Y1,0–Y1,32 are x- and y-coordinates at points Q1,0–Q1,32 on the segmental curve C2 of FIG. 4(B).

An address pointer PNT1 of RAM1 is composed of independent address sub-pointers PNT1A, PNT1B, PNT1C and PNT1D. The sub-pointers PNT1A, PNT1B, PNT1C and PNT1D point to addresses of the data WA0–WA256, WB0–WB256, WC0–WC256 and WD0–WD256 (see FIG. 6) respectively.

An address pointer PNT2 of RAM2 is intended to point to addresses of the respective coordinate data (see FIG. 7) at the anchor and control points, the data being stored in RAM2.

An address pointer PNT3 of RAM3 serves to point to addresses of the step-numbers $\Delta$n1, $\Delta$n2, . . . (see FIG. 8) which are stored in RAM3.

An address pointer PNT4 of RAM4 points to addresses of coordinate data X0,0–X0,16 and Y0,0–Y0,16 (see FIG. 9) which are obtained by the hardware calculations.

A latch circuit STP acts to latch the step-numbers $\Delta$n, $\Delta$n2, . . . (see FIG. 8) which are stored in RAM3.

An adder circuit ADD adds a value of the address sub-pointer (PNT1A, PNT1B, PNT1C or PNT1D) that is now being selected to the value of the latch circuit STP. The adder circuit ADD sends the result of this addition to the address sub-pointer that is now being selected. To be specific, the adder circuit ADD increments the values of the address sub-pointers by the step-numbers $\Delta$n1, $\Delta$n2, . . . which are being latched by the latch circuit STP.

A multiplier circuit MLT multiplies the data stored in RAM1 shown in FIG. 6 by the data stored in RAM2 of FIG. 7. That is, the circuit MLT performs the multiplication (e.g., WA×PA) in the formula (1).

An arithmetic logical circuit ALU adds the multiplied value given by the multiplier circuit MLT to the value in an accumulator which will be stated later.

The accumulator ACC holds the arithmetic result of the arithmetic logical circuit ALU and transmits it to one input of this circuit ALU. Namely, the arithmetic logical circuit ALU and the accumulator ACC cooperate to perform the addition in the formula (1).

A control circuit CONT controls the arithmetic process upon receiving a command from the microprocessor CPU0. The control circuit CONT incorporates a microprogram relative to the above-described arithmetic processes.

Referring to flowcharts of FIGS. 2(A), 2(B) and 2(C), an operation of the circuit depicted in FIG. 1 will be explained.

Initialization is at first effected on the basis of a signal from the microprocessor CPU0.

(a): Transmitted from RAM0 to RAM1 are the data corresponding to respective "t" of the parameter functions WA, WB, WC and WD shown in FIG. 5. The data are, as shown in FIG. 6, stored in RAM1. Transmitted from RAM0 to RAM2 are the data of coordinates at the anchor and control points for each of the segmental curves C1–C14 of FIG. 3. The coordinate data are then, as shown in FIG. 7, stored in RAM2. Transmitted from RAM0 to RAM3 are the step-number data $\Delta$n1, $\Delta$n2, . . . for each of the segmental curves C1–C14 corresponding to the number of subdivisions of the respective segmental curves C1–C14 shown in FIG. 3. The step-number data are, as shown in FIG. 8, stored in RAM3.

(b): The address pointers PNT2, PNT3 and PNT4 are set respectively to "0". As a result, the addresses in which the data PAX0 of FIG. 7, the data Δn1 of FIG. 8 and the data X0,0 of FIG. 9 are stored are pointed to.

The initialization has thus come to an end. Next, the arithmetic operation for the segmental curve C1 depicted in FIGS. 3 and 4(A) is executed.

(c): "0" is set to the address sub-pointer PNT1A. "257" is set to the address sub-pointer PNT1B. "514" is set to the address sub-pointer PNT1C. "771" is set to the address sub-pointer PNT1D. As illustrated in FIG. 6, the addresses in which the data WA0, WB0, WC0 and WD0 are stored are pointed to. Latched by the latch circuit STP is data M [PNT3] stored in an address "0000" of RAM3, the address being pointed by the address pointer PNT3. Latched is the step-number Δn1 (the step-number "16" corresponding to the number of subdivisions of the segmental curve C1 of FIG. 4(A)) shown in FIG. 8.

(d): The following is a way of performing the calculation routine shown in FIG. 2(B).

To obtain the x-coordinates at the point Q0,0 shown in FIG. 4 (A), "WA×PA+WB×PB+WC×PC+WD×PD" in the formula (1) is performed in the following manner.

(d1): The accumulator ACC is cleared, and "0" is set.

(d2): Transferred to an input "X" of the multiplier circuit MLT is data M [PNT1A], i.e., "WA0" (see FIG. 6) stored in an address "0000" of RAM1, this address being pointed by the address sub-pointer PNT1A. Transferred to an input "Y" of the multiplier circuit MLT is data M [PNT2], viz., "PAX0" (see FIG. 7) stored in the address "0000" of RAM2, this address being pointed by the address pointer PNT2.

(d3): The multiplication and addition of FIG. 2(C) are carried out as follows.

(d101): Outputted to "Z" of the multiplier circuit MLT is the product, given by "WA0×PAX0" of the value "WA0" of the input "X" of the multiplier circuit MLT and a value "PAX0" of the input "Y" thereof. That is, the calculation corresponding to "WA×PA" in the formula (1) is effected. A result of this calculation is sent to an input "Y" of the arithmetic logical circuit ALU. On the other hand, the data "0" of the accumulator ACC is transferred to an input "X" of the arithmetic logical circuit ALU.

(d102): The value of the input "X" of the arithmetic logical circuit ALU is added to the value of the input "Y" thereof. The result of this addition is sent to the accumulator ACC. As a result, the value given by "WA0×PAX0" is held in the accumulator ACC.

(d103): "1" is added to the value of the address pointer PNT2, whereby the pointer value becomes "0001".

(d4): Transferred to the input "X" of the multiplier circuit MLT is data M [PNT1B], i.e., "WB0" (see FIG. 6) stored in an address "0257" of RAM1, this address being pointed by the address sub-pointer PNT1B. Transferred to the input "Y" of the multiplier circuit MLT is data M [PNT2], viz., "PBX0" (see FIG. 7) stored in an address "0001" of RAM2, this address being pointed by the address pointer PNT2.

(d5): The multiplication and addition of FIG. 2(C) are performed. The fundamental operations are the same as those described in the item (d3). The multiplier circuit MLT obtains the product of "WB0" shown in FIG. 6 and "PBX0" shown in FIG. 7, the product being given by "WB0×PBX0" corresponding to "WB×PB" shown in the formula (1). The arithmetic logical circuit ALU adds the value of "WB0×PBX0" to the value, held in the accumulator ACC, of "WA0×PAX0". Held in the accumulator ACC is the result of the calculation such as "WA0×PAX0+WB0×PBX0". Namely, the calculation corresponding to "WA×PA+WB×PB" in the formula (1) is performed.

(d6): Transferred to the input "X" of the multiplier circuit MLT is data M [PNT1C], i.e., "WC0" (see FIG. 6) stored in an address "0514" of RAM1, this address being pointed by the address sub-pointer PNT1C. Transferred to the input "Y" of the multiplier circuit MLT is data M [PNT2], i.e., "PCX0" (see FIG. 7) stored in an address "0002" of RAM2, this address being pointed by the address pointer PNT2.

(d7): The multiplication and addition of FIG. 2(C) are carried out. The fundamental operations are the same as those explained in (d3). The multiplier circuit MLT obtains the product of "WC0" shown in FIG. 6 and "PCX0" shown in FIG. 7, this product being given by "WC0×PCX0" corresponding to "WC×PC" in the formula (1). The arithmetic logical circuit ALU adds the result of this calculation of "WC0×PCX0" to the value held in the accumulator ACC, of "WA0×PAX0+WB0×PBX0". Held in the accumulator ACC is the result of this calculation: "WA0×PAX0+WB0× PBX0+WC0×PCX0". That is, there is herein effected the calculation corresponding to "WA×PA+WB×PB+WC×PC" in the formula (1).

(d8): Transferred to the input "X" of the multiplier circuit MLT is data M [PNT1D], viz., "WD0" (see FIG. 6) stored in an address "0771" of RAM1, this address being pointed by the address sub-pointer PNT1D. Transferred to the input "Y" of the multiplier circuit MLT is data M [PNT2], i.e., "PDX0" (see FIG. 7) stored in an address "0003" of RAM2, this address being pointed by the address pointer PNT2.

(d9): The multiplication and addition of FIG. 2(C) are effected. The fundamental operations are the same as those described in the item (d3). The multiplier circuit MLT obtains the product of "WD0" shown in FIG. 6 and "PDX0" shown in FIG. 7, this product being given by "WD0×PDX0" corresponding to "WD×PD" in the formula (1). The arithmetic logical circuit ALU adds the result of this calculation of "WD0×PDX0" to the value held in the accumulator ACC, of "WA0×PAX0+WB0×PBX0+WC0×PCX0". Held in the accumulator ACC is the result of this calculation: "WA0× PAX0+WB0×PBX0+WC0×PCX0+WD0×PDX0". Namely, the calculation corresponding to "WA×PA+WB×PB+WC× PC+WD×PD" is performed.

(d10): The x-coordinates at the point Q0,0 shown in FIG. 4(A) are calculated in the manner discussed above. The calculation results held in the accumulator ACC are stored in the address "0000" of RAM4 which is pointed by the address pointer PNT4. The stored data M [PNT4] is expressed as "X0,0" in FIG. 9.

(d11): "1" is added to the value of the address pointer PNT4, whereby the pointer value becomes "0001".

(d12)–(d21): Next, for obtaining y-coordinates at the point Q0,0 shown in FIG. 4(A), as in the manner of (d1) through (d10), the processes of (d12)–(d21) shown in FIG. 2(B) are carried out. Stored in the address "0001" of RAM4 that is pointed by the address pointer PNT4 is the arithmetic result obtained by "WA0×PAY0+WB0×PBY0+WC0× PCY0+WD0×PDY0". The thus stored data M [PNT4] is expressed as "Y0,0" in FIG. 9.

(d22): "1" is added to the value of the address pointer PNT4, as a result of which the pointer value becomes "0002".

(d23): "8" is subtracted from the value of the address pointer PNT2, whereby the pointer value becomes "0000".

Figure 2:
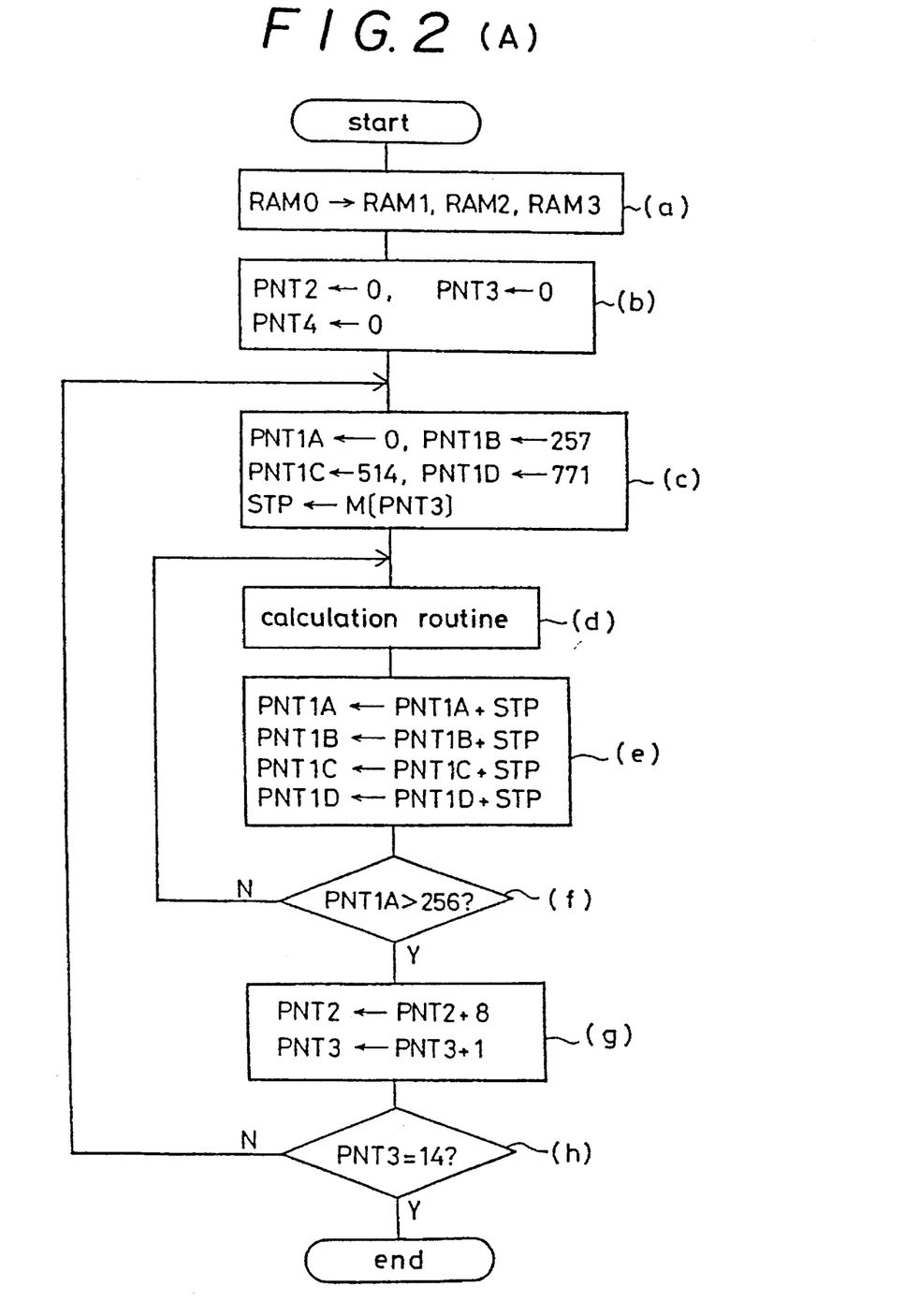
FIGS. 2(A), 2(B) and 2(C) are flowcharts showing operations relative to FIG. 1.

The calculation routine shown in FIG. 2(A) is thus finished. The x-coordinates "X0,0" and y-coordinates "Y0, 0" at the point Q0,0 of FIG. 4(A) are stored in RAM4 (see FIG. 9).

(e): Added to each of the values of the address sub-pointers PNT1A, PNT1B, PNT1C and PNT1D is the step-number Δn1 (the step-number "16" corresponding to the number of subdivisions of the segmental curve C1 of FIG.

4(A)), this step-number being latched by the latch circuit STP. The pointer values of the address sub-pointers PNT1A, PNT1B, PNT1C and PNT1D are "16", "273" (257+16), "530" (514+16), "787" (771+16), respectively.

(f): Whether or not the value of the address sub-pointer PNT1A is larger than "256" is determined, The present value of the address sub-pointer PNT1A is "0016". Therefore, the process moves to a calculation routine (d). The same process as that explained in the item (d) is carried out. Consequently, the x-coordinates "X0,1" and y-coordinates "Y0,1" at the point QO,1 of FIG. 4(A) are stored in RAM4 (see FIG. 9). As the specific data, "X0,1" is "WA16×PAX0+WB16×PBX0+WC16×PCX0+WD16× PDX0". "Y0,1" is "WA16×PAY0+WB16×PBY0+WC16× PCY0+WD16×PDY0" (see FIGS. 6 and 7).

The same process continues in this manner until the value of the address sub-pointer PNT1A exceeds "256". Stored sequentially in RAM4 are x-coordinates "X0 0"–"X0,16" and y-coordinates "Y0,0"–"Y0,16" at the points Q0,0–Q0, 16 shown in FIG. 4(A) (see FIG. 9).

(g): When the value of the address sub-pointer PNT1A becomes greater than "256" the following process is effected. "8" is added to the value of the address pointer PNT2, as a consequence of which the pointer value becomes "0008" (see FIG. 7). "1" is added to the value of the address pointer PNT3, whereby the pointer value becomes "0001" (see FIG. 8).

Thus, the processes associated with the segmental curve C1 shown in FIGS. 3 and 4(A) are finished.

(h): Whether or not the value of the address pointer PNT3 comes to "14" is determined. This value "14" corresponds to the number of subdivisions of the segmental curve of FIG. 3. This value is properly selected for each segmental curve.

The present value of the address pointer PNT3 is "0001". The process moves to a calculation routine (c). The same processes as those stated in the items (c) to (g) are performed. Stored sequentially in RAM4 are x-coordinates "X1,0"–"X1,32" and y-coordinates "Y1,0"–"Y1,32" at points Q1,0–Q1,32 shown in FIG. 4(B) (see FIG. 9).

In this manner, the same processes are effected with respect to the segmental curves C1–C14 of FIG. 3 until the value of the address pointer PNT3 becomes "14". When the value of the address pointer PNT3 has come to "14" it is determined that the processes for the segmental curves C1–C14 of FIG. 3 have been finished.

As discued above, the number of subdivisions of each segmental curve can adequately be selected depending on its curvature. Selecting the optimum number of subdivisions of each segmental curve enables a speed-up of the hardware calculations. In general, if the curvature is small, an accurately-expressed approximate curve can be obtained even with a small number of subdivisions.

The following is a description of a method for obtaining the optimum number of subdivisions of the segmental curve.

To start with, a first method will be explained referring to FIG. 10.

Figure 10:
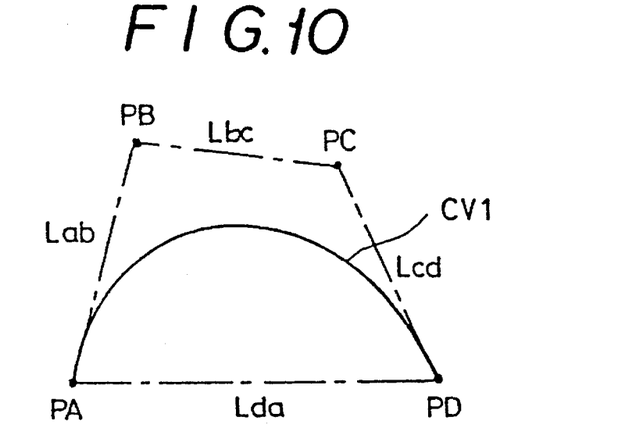
FIG. 10 is a diagram to aid in the explaination of a first method for obtaining the number of subdivisions of a segmental curve.

In FIG. 10, the symbols PA and PD represent anchor points of the segmental curve Cl, while PB and PC denote control points thereof. Lab, Lbc, Lcd and Lda are lengths of line segments connecting PA to PB, PB to PC, PC to PD and PD to PA. Generally, the lengths of the line segments Lab and Lcd increase with a larger curvature of a segment curve CV1. Hence, the optimum number "N" of subdivisions of the segmental curve Cv1 can be obtained by the following estimating expressions.

$$\Delta L = (Lab + Lbc + Lcd - Lda) + 1 \quad (3)$$

$$N = 2^{\{\log(a) \Delta L\}} \quad (4)$$

$$2 \leq a \leq 8 \text{ ("a" is the base)}$$

Note that the base "a" is properly selected according to the approximate accuracy of the curve. The subdividing number "N" in the expression (4) is selected so as not to exceed the number of subdivisions ("256" in the example of FIG. 6) in the data table.

Figure 11:
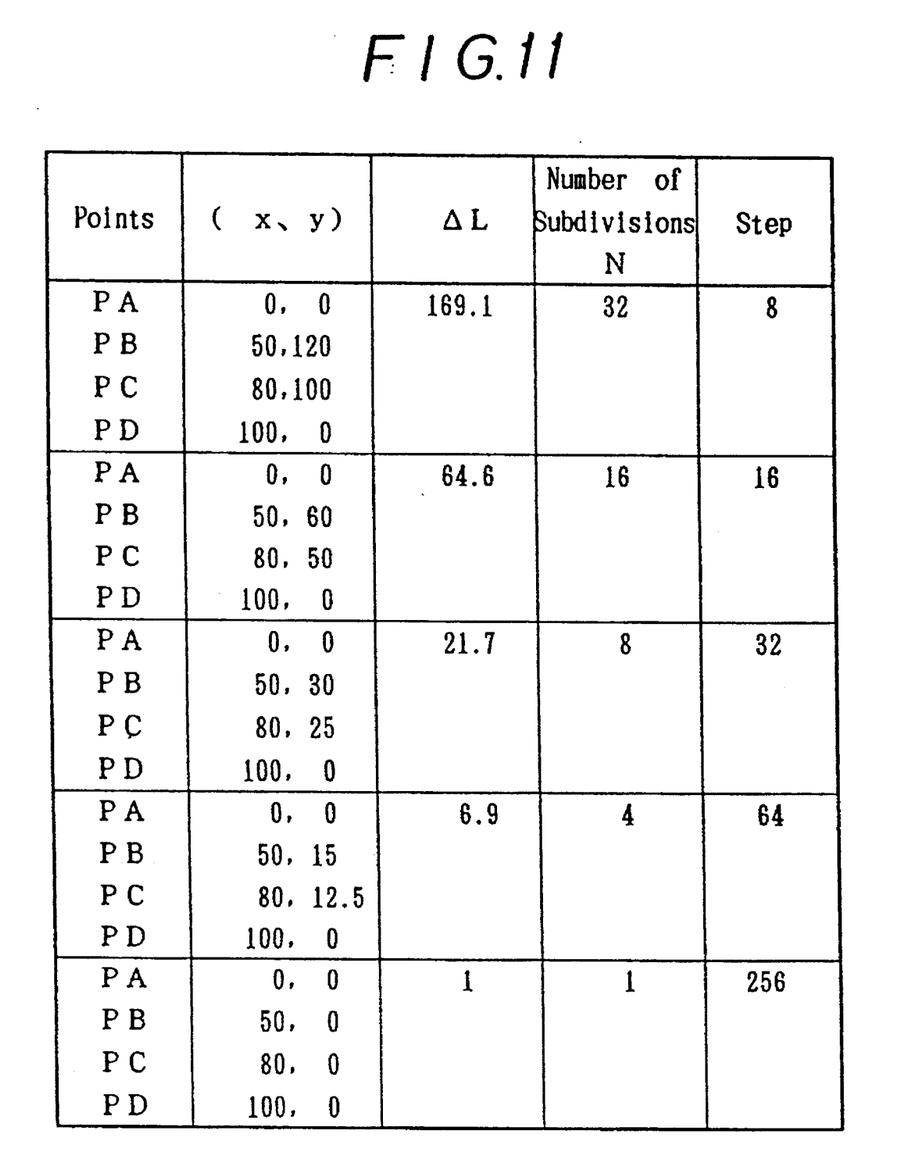
FIG. 11 is a diagram showing a specific example where the number of subdivisions is obtained by the first method.

FIG. 11 exemplifies the numbers of subdivisions that are given by the above-described estimating expressions. FIG. 11 shows an example where the y-coordinates at the control points PB and PC are sequentially reduced—i.e., the curvature of the segmental curve is gradually decreased. Note that the "step" shown in FIG. 11 is a value obtained by "256/N". This corresponds to the step-number data Δn1, Δn2, shown in FIG. 8. As shown in FIG. 11, when employing the aforementioned estimating expressions, it can be understood that the number of subdivisions decreases as the curvature of the segmental curve decreases.

It should be noted that the values of respective line segments are used as they are in the formula (3). Values obtained by squaring the lengths of these line segments may also be employed.

Next, a second method will be explained in conjunction with FIGS. 12 and 13.

Figure 12:
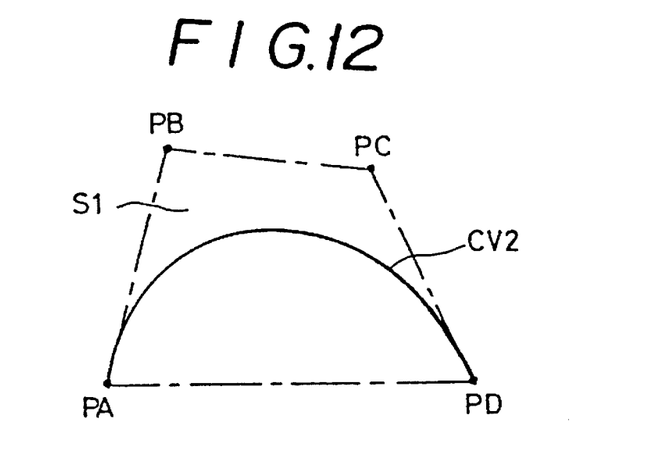
FIGS. 12 and 13 are explanatory diagrams showing a second method for obtaining the number of subdivisions of the segmental curve.

Referring to FIG. 12, the symbols PA and PD designate anchor points of a segmental curve CV2, while PB and PC indicate control points thereof. The symbol S1 is the area of a quadrangle shaped by sequentially connecting the points PA, PB, PC and PD with straight lines. Typically, the area S1 of the quadrangle increases with a larger curvature of the segmental curve CV2. Hence, the optimum subdividing number "N" of the segmental curve CV2 can be obtained by the following estimating expression.

$$N = 2^{\{\log(a) S1\}} \quad (5)$$

$$2 \leq a \leq 8 \text{ ("a" is the base)}$$

Note that the base "a" is adequately selected according to the approximate accuracy of the curve. The subdividing number "N" in the formula (5) is selected so as not to exceed the number of subdivisions ("256" in the example of FIG. 6) in the data table.

Figure 13:
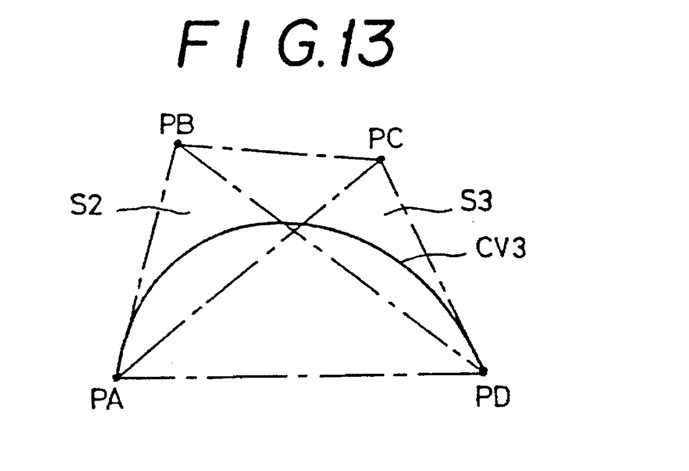

In FIG. 13, the symbols PA and PD denote anchor points of a segmental curve CV3, while PB and PC represent control points thereof. The symbol S2 indicates an area of a triangle shaped by sequentially connecting the points PA, PB and PD with straight lines. The symbol S3 is an area of a triangle shaped by sequentially connecting the points PA, PC and PD with straight lines.

A sum, given by "S2+S3" of the areas S2 and S3 of the triangles increments with the greater curvature of the segmental curve CV3. Therefore, the optimum subdividing number "N" can be obtained by the following estimating expression.

$$N = 2^{\{\log(a) (S2+S3)\}} \quad (6)$$

$$2 \leq a \leq 8 \text{ ("a" is the base)}$$

The base "a" is properly selected according to an approximate accuracy of the curve. The subdividing number "N" shown in the formula (6) is selected so as not to exceed the number of subdivisions ("256" in the example of FIG. 6) in the data table.

It is to be noted that the values of the areas are employed as they are in the formulae (5) and (6). Values obtaining by squaring these areas may also be used.

A third method will now be described with reference to FIG. 14.

Figure 14:
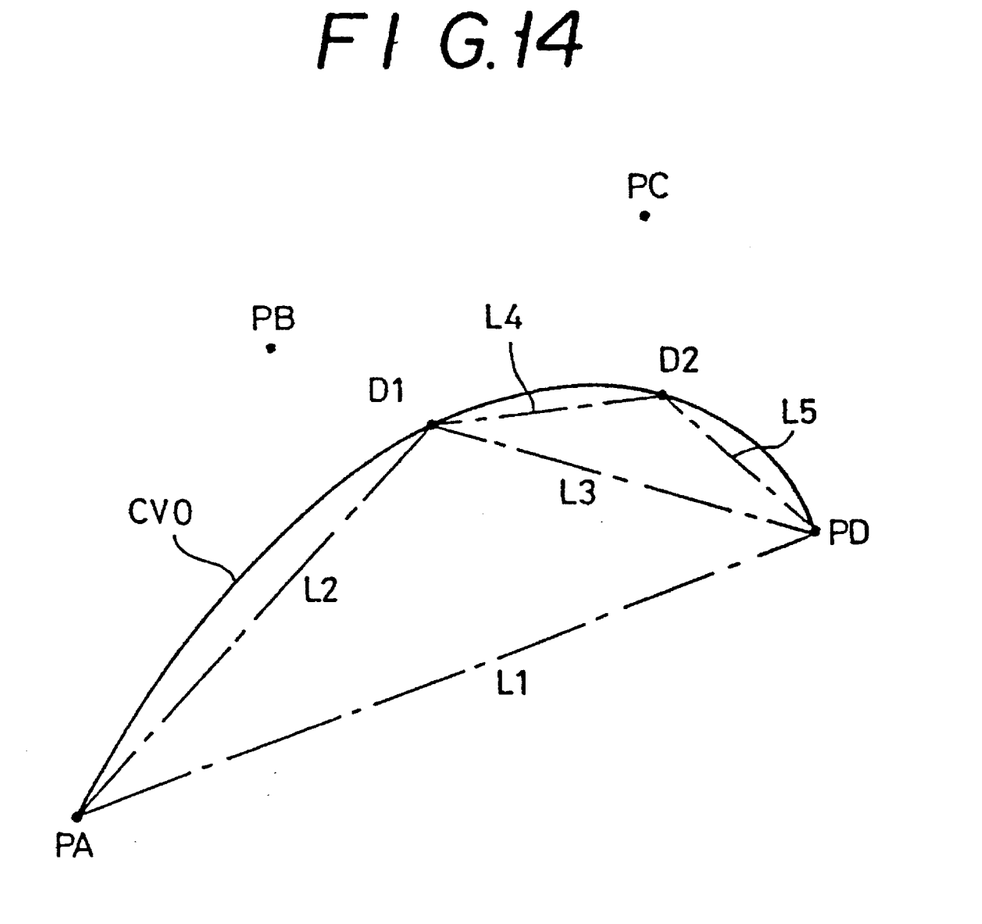
FIG. 14 is an explanatory diagram showing a third method for obtaining the number of subdivisions of the segmental curve.

In FIG. 14, the symbols PA and PD indicate anchor points of a segmental curve CV0, while PB and PC are control points thereof. D1 represents a first subdividing point other than the anchor points PA and PD on the segmental curve CV0. To be specific, values of WA–WD are obtained such as t=½ in the formulae (2a)–(2d). These values are substituted into the formula (1), thereby obtaining the first subdividing point D1. In the segmental curve CV0, the part between the point PD and the first subdividing point D1 is referred to as the first subdivided curve. D2 is the second subdividing point positioned between PD and D1 on the segmental curve CV0. The second subdividing point D2 is a point other than PD and D1. To be specific, values of WA–WD are obtained such as t=¾ (=½+¼) in the formulae (2a)–(2d). The point D2 is obtained by substituting these values into the formula (1). Note that in the Segmental curve CV0, the part interposed between the point PD and the second subdividing point D2 is referred to as the second subdivided curve. Similarly, a third subdividing point D3 (not illustrated) on the segmental curve CV0 is prescribed on the basis of t=⅞ (=½+¼+⅛). A fourth subdividing point D4 (not illustrated) on the segmental curve CV0 is prescribed on the basis of t=15/16 (=½+¼+⅛+1/16). Thus, subdividing points Dn (not shown) on the segmental curve CV0 are sequentially prescribed. Note that the first to n-th subdividing points D1–Dn can be obtained at a high speed by employing the data table of FIG. 5 in the manner described above. L1 is the length of the line segment connecting the point PA to the point PD with a straight line. L2 is the length of the line segment connecting the point PA to the first subdividing point D1 with a straight line. L3 is the length of the line segment connecting the point PD to the first subdividing point D1 with a straight line. L4 is the length of the line segment connecting the first subdividing point D1 to the second subdividing point D2 with a straight line. L5 is the length of the line segment connecting the point PD to the second subdividing point D2 with a straight line.

Operations for obtaining the number of subdivisions will hereinafter be described referring to FIG. 14.

After obtaining the first subdividing point D1, the segment lengths L1, L2 and L3 are obtained, respectively. Differential data is given by:

$$\Delta L1 = L2 + L3 - L1 \tag{7a}$$

Whether or not the first differential data $\Delta L1$ satisfies the following condition is determined.

$$\Delta L1 < \Delta L0 \tag{7b}$$

where $\Delta L0$ is the predetermined constant. If the first differential data L1 meets the condition of the formula FIG. 14 is "1". If not, after obtaining the second subdividing point D2, segment lengths L4 and L5 are obtained. Second differential data is then expressed as:

$$\Delta L2 = L4 + L5 - L3 \tag{8a}$$

Whether or not the second differential data L2 satisfies the following condition is determined.

$$\Delta L2 < \Delta L0 \tag{8b}$$

If the second differential data L2 meets the condition of the formula (8b), the subdividing number of the segmental curve CV0 of FIG. 14 becomes "2". If not, the subdivisions are effected in the same way as above-discussed. The subdividing points D3, D4, . . . , Dn are sequentially obtained. Pieces of differential data $\Delta L3$, $\Delta L4$, . . . $\Delta Ln$ are also obtained. Whether or not the n-th differential data Ln satisfies the following condition is determined.

$$\Delta Ln < \Delta L0 \tag{9b}$$

If the n-th differential data Ln meets the condition of the formula (9b), a subdividing number of the segmental curve CV0 of FIG. 14 is "$2^{n-1}$".

Based on the fourth method discussed above, the respective subdividing points are obtained under the conditions that t=½, t=¾ (=½+¼), t=⅞ (=½+¼+⅛), t=15/16 (=½+¼+⅛+1/16), . . . . These subdividing points may, however, be obtained under conditions in which, for example, t=½, t=¼ (=½–¼), t=⅜ (=½–¼+⅛), t=5/16 (=½–¼+⅛–1/16), . . . . In short, when obtaining the k-th subdividing point, "½$^r$" may be added to or subtracted from subdividing point, "½$^r$" may be added to or subtracted from the value of "t" at the (k–1)th subdividing point.

According to the present invention, the data corresponding to the subdividing number of the segmental curve is preset for each segmental curve. Hence, the subdividing number is not required to be obtained each time. The time needed for generating the outline font can consequently be greatly reduced.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A method for representing an approximation of a first curvilinear curve and constructing a curve represented by said approximation, comprising the steps of subdividing a first curve depicting a character or graph into a given number of segmental curves, expressing each said segmental curve by first and second anchor points and at least one control point; subdividing said each segmental curve into a plurality of parts; and constructing approximate curves of said segmental curves by connecting subdividing points adjacent to one another with straight lines, thereby representing an approximate curve of said first curve, the improvement comprising prestoring data for each said segmental curve, said data corresponding to the number of subdivisions of said segmental curve, subdividing said segmental curve into said number of subdivisions, and constructing said approximate curves of said segmental curves by joining points corresponding to the ends of said number of subdivisions with straight lines, thereby representing said approximate curve of said first curve.

2. In a method for representing an approximation of a first curvilinear curve and constructing a curve represented by said approximation, comprising the steps of subdividing a first curve depicting a character or graph into a given number of segmental curves, expressing each said segmental curve by first and second anchor points and at least one control point; subdividing each said segmental curve into a plurality of parts; and constructing approximate curves of said segmental curves by connecting subdividing points adjacent to one another with straight lines, thereby representing an approximate curve of said first curve, the improvement wherein different segmental curves have different numbers of subdivisions, comprising prestoring data for each said segmental curve, said data including data corresponding to the number of subdivisions of the respective said segmental curves and coordinates of different points on the respective segmental curves, subdividing said segmental curve into said number of subdivisions, and constructing said approximate curves of said segmental curves by retrieving said prestored data to determine the coordinates of different points of the respective segmental curves and joining points corresponding to the ends of said number of subdivisions with straight lines, thereby representing said approximate curve of said first curve.

3. The method of claim 2 wherein said step of retrieving comprises employing said data corresponding to the number of subdivisions to point to said data corresponding to the coordinates of said different points.

4. A method for representing an approximation of a first curvilinear curve and constructing a curve represented by said approximation, comprising the steps of subdividing a first curve depicting a character or graph into a given number of segmental curves, expressing each said segmental curve by first signals representative of first and second anchor points and at least one control point; processing said first signals for each said segmental curve into second signals corresponding to coordinates of a plurality of subdivision points of each of said segmental curves; and constructing curves approximating said segmental curves by processing said second signals to produce a curve connecting said subdividing points of said segmental curves adjacent to one another with straight lines, thereby representing a curve of that approximates said first curve, the improvement comprising prestoring data signals for each said segmental curve, said data signals corresponding to a number of subdivisions of each said segmental curve, with the number of subdivisions of at least one segmental curve being different than the number for at least one other segmental curve, said step of processing the first signals comprising processing the first signal corresponding to each segmental curve to produce a plurality of second signals of each said segmental curve corresponding to the prestored data signal for the respective segmental curve, and producing approximation curves of said segmental curves by joining points represented by said second signals that correspond to the ends of said number of subdivisions thereof with straight lines, thereby representing said approximate curve of said first curve.

5. An apparatus for constructing a second curve that is an approximation of a first curvilinear curve, comprising a computer having a program memory and a RAM, wherein said program memory controls said computer to provide first signals representative of anchor points and control points of segmental curves depicting a character or graph, and controls said computer to produce second signals corresponding to coordinate points of a given number of subdivisions of segmental curves, and said program memory further controls the computer to output signals corresponding to approximate curves represented by straight line interconnections between said coordinate points of said subdivisions of each segmental curve, the improvement wherein said RAM has a data signal stored therein corresponding to a predetermined number of subdivisions for each of said segmental curves, said predetermined number for at least one of said segmental curves being different than the predetermined number for at least one other of said segmental curves, and said program memory controls said computer to output second signals corresponding to coordinate points of a number of subdivisions of each said segmental curve corresponding to the data signal stored in said RAM for the respective segmental curve.

6. The apparatus of claim 5 wherein said RAM has stored therein further signals corresponding to control points and anchor points of each of said segmental curves.

7. The apparatus of claim 5 wherein said RAM has a first portion wherein said data signals are stored, a second portion wherein signals corresponding to coordinates of anchor points and control points of said segmental curves are stored, and a third portion wherein parameter functions of said segmental curves are stored.

8. The apparatus of claim 7 wherein said data signals stored in said RAM directly represent the number of subdivisions of each of said segmental curves.

9. The apparatus of claim 7 wherein said data signals stored in said RAM are step numbers that represent increments in the number of subdivisions of said segmental curves.

10. The apparatus of claim 7 wherein said RAM further comprises a portion storing pointers for accessing said first, second and third portions thereof.

* * * * *